United States Patent
Porikli et al.

(10) Patent No.: US 9,734,558 B2
(45) Date of Patent: Aug. 15, 2017

(54) METHOD FOR GENERATING HIGH-RESOLUTION IMAGES USING REGRESSION PATTERNS

(71) Applicant: Mitsubishi Electric Research Laboratories, Inc., Cambridge, MA (US)

(72) Inventors: Fatih Porikli, O'Malley (AU); Ashish Shrivastava, Catonsville, MD (US); Jay Thornton, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/220,402

(22) Filed: Mar. 20, 2014

(65) Prior Publication Data

US 2015/0269708 A1 Sep. 24, 2015

(51) Int. Cl.
  *G06T 3/40* (2006.01)
  *G06T 5/00* (2006.01)

(52) U.S. Cl.
  CPC .......... *G06T 3/4076* (2013.01); *G06T 3/4007* (2013.01); *G06T 3/4053* (2013.01);
  (Continued)

(58) Field of Classification Search
  None
  See application file for complete search history.

(56) References Cited

U.S. PATENT DOCUMENTS

| | | | |
|---|---|---|---|
| 5,684,544 A | * | 11/1997 | Astle .............................. 348/708 |
| 5,949,914 A | * | 9/1999 | Yuen ............................. 382/254 |
| 2015/0023611 A1 | * | 1/2015 | Salvador et al. ............. 382/263 |

FOREIGN PATENT DOCUMENTS

CN   103455988 A   * 12/2013

OTHER PUBLICATIONS

Sheng Wang; Xiangjian He; Qiang Wu; Jie Yang, "Generalized local N-ary patterns for texture classification," Advanced Video and Signal Based Surveillance (AVSS), 2013 10th IEEE International Conference on , vol. , No. , pp. 324,329, Aug. 27-30, 2013.*

(Continued)

*Primary Examiner* — Sumati Lefkowitz
*Assistant Examiner* — Jiangeng Sun
(74) *Attorney, Agent, or Firm* — Gene Vinokur; James McAleenan; Hironori Tsukamoto

(57) ABSTRACT

A method generates a high-resolution (HR) image from a low-resolution (LR) image using regression functions. During a training stage, training HR images are downsampled to LR images. A signature is determined for each LR-HR patch pair based on a local ternary pattern (LTP). The signature is a low dimensional descriptor used as an abstraction of the patch pair features. Then, patch pairs with the same signature are clustered, and a regression function which maps the LR patches to the HR patches is determined. In some cases patch pairs of similar signatures can be combined for learning and a single regression function determined, thus decreasing the number of required regression functions. During actual upscaling, LR patches of an input image are similarly processed to obtain the signatures and from the regression functions. The LR patches can then be upscaled using the training regression functions.

16 Claims, 4 Drawing Sheets

(52) U.S. Cl.
CPC .... *G06T 5/003* (2013.01); *G06T 2207/20021* (2013.01); *G06T 2207/20076* (2013.01); *G06T 2207/20081* (2013.01); *G06T 2207/30168* (2013.01)

(56) References Cited

OTHER PUBLICATIONS

Pithadia et al. "Super-Resolution using DCT based Learning with LBP as Feature Model," Computing Communication & Networking Technologies, 2012 Third Intl. Conference On, IEEE, Jul. 26, 2012, pp. 1-6.

Kwang et al. "Example-Based Learning for Single Image Super Resolution," Jun. 10, 2008, Pattern Recognition; Lecture notes in Computer Science, Springer Berlin Heidelberg. pp. 456-465.

Xiaoxuan et al. "A Super Resolution method for Recognition of License Plate Character using LBP and RBF." Machine Learning for Signal Processing, 2011 IEEE Intl. Workshop On, IEEE. Sep. 18, 2011. pp. 1-5.

* cited by examiner

METHOD FOR GENERATING HIGH-RESOLUTION IMAGES USING REGRESSION PATTERNS

FIELD OF THE INVENTION

This invention relates generally to image processing, and more particularly to generating high-resolution images.

BACKGROUND OF THE INVENTION

It is common to acquire low-resolution (LR) images using devices such as mobile telephones, laptops, web cameras and other hand-held devices for display on high-resolution (HR) display devices. Typically, the LR to HR transformation is done by upscaling or upsampling, which is an ill-posed inverse problem because the number of unknown pixels in the HR image can exceed the number of known pixels in the LR image by orders of magnitude. This problem is exacerbated by unique difficulties encountered in modeling images of natural scenes, as well as inevitable camera blur and noise in LR images.

Upscaling methods can be parametric or non-parametric. The parameteric methods model the HR image using, e.g., bicubic interpolation. That method assumes a band-limited structure in the LR image. A total variation minimization method assumes that the LR image has a bounded total variation norm. Probabilistic models assume a prior probability on gradient profiles of the image, and specify or estimate from hyperparameters of prior probabilities. Sparse models assume that image patches are sparse in a basis, or learned dictionary.

A non-parametric method does not assume an explicit model for images or image patches. Instead, that method exploits natural image invariances, such as scale-in variance, or translation-invariance. In such cases, the prior probability of the HR resolution unknown image patches are obtained from patches stored in a database, or patches from a scale-space input image. The method "learns" correspondences between the LR patches and the HR patches. During reconstruction, every occurrence of a LR resolution patch is replaced by the corresponding HR patch. Both parametric and non-parametric methods have drawbacks.

Neither method reproduces realistic textural details for even moderate upscaling factors. The resulting images suffer from various artifacts such as blurry edges, exaggerated noise, halos, ringing and aliasing artifacts. All prior art upscaling methods require considerable computational resources, e.g., upscaling a small image by a factor of sixteen can take several minutes or hours, making the methods useless for real-time applications.

SUMMARY OF THE INVENTION

Embodiments of the invention provide a method for generating a high-resolution (HR) image from a low-resolution (LR) image. The method uses regression functions derived from pairs of HR and LR patches within clusters based on signatures. The signature uses a local n-ary pattern (LnP) to group patches of similar appearance and from the group learn a regression function that will estimate an output HR patch corresponding to the LR patch. For example, the LnP can be a local binary pattern or a local ternary pattern.

The method uses two main stages: off-line training and real-time upscaling. During off-line training, pairs of training LR-HR patches are generated. The patches can be overlapping. For example, the HR patch is some predetermined size and the LR patch is a downsampled version of the HR patch for some predetermined scale parameter. The regression functions are based on the LnP of the LR patches in the LR-HR patch pairs. Dining real-time upscaling, the HR image is generated from the input LR image by applying the regression function based on the LnP in a patch-by-patch fashion. When patches overlap, pixel values in the overlap regions can obtained from the multiple estimates by averaging, or computing a median, etc. The method generates HR images without blurry salient edges and the loss of fine textural detail.

DETAILED DESCRIPTION OF THE PREFERRED EMBODIMENTS

Embodiments of our invention provide a method for generating an output high-resolution (HR) image from an input low-resolution (LR) image. The input LR image can be either natural or synthetic with low noise variance and detailed textural patterns. It should be understood that the method can process a sequence of images, e.g., a video. It is further understood that the processing in either case can be in real-time.

Figure 1:
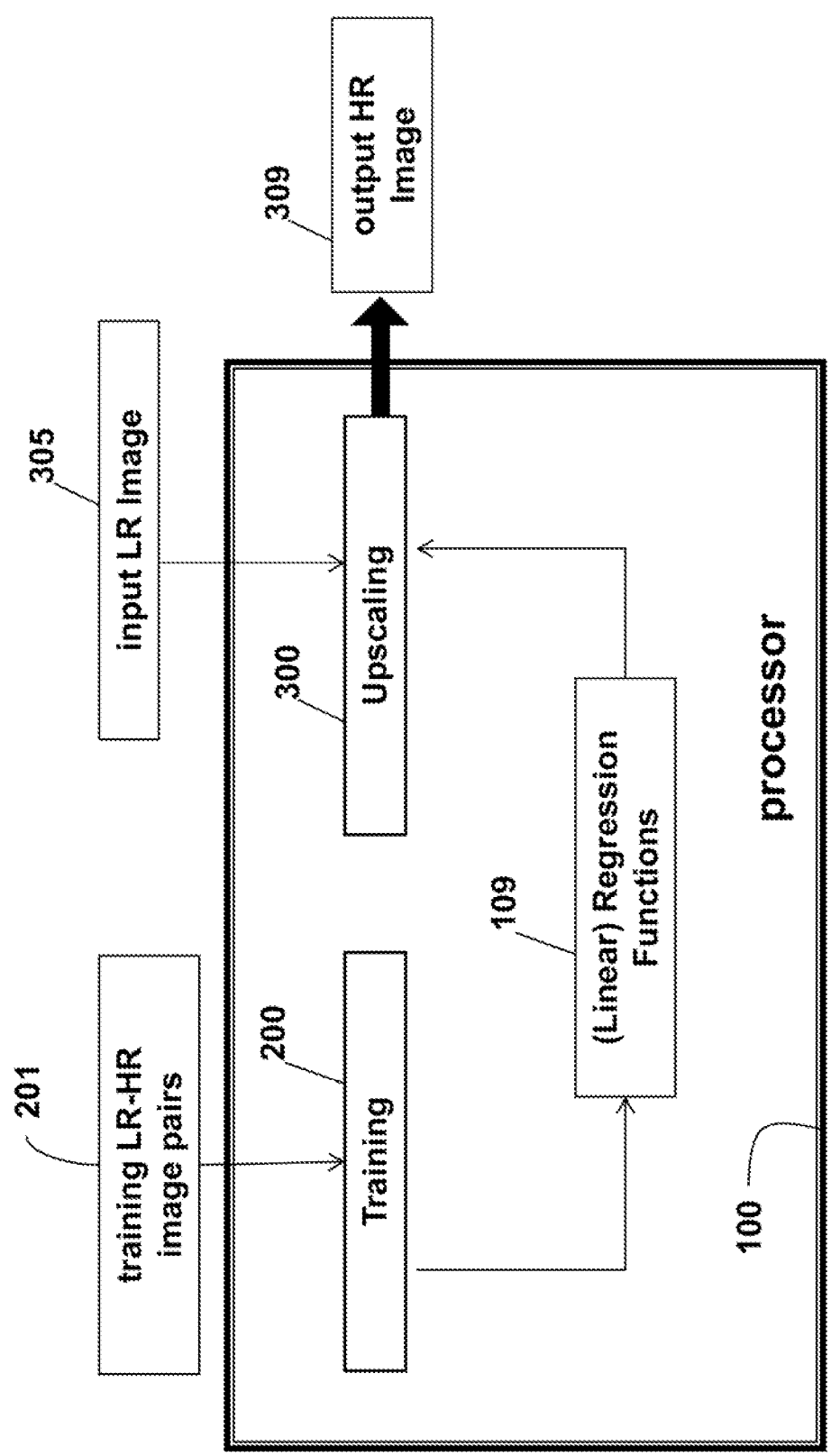
FIG. 1 is a flow diagram of the training and upscaling stages according to the embodiments of the invention.

FIG. 1 shows training 200 a set of regression functions 109 from pairs of corresponding training LR and HR images 201. The upscaling 300 uses the regression functions to generate the output HR image 309 from the input LR image 305. The training 200 and upscaling 300 can be performed by processor 100 connected to memory and input/output interfaces by buses as known in the art.

Figure 2:
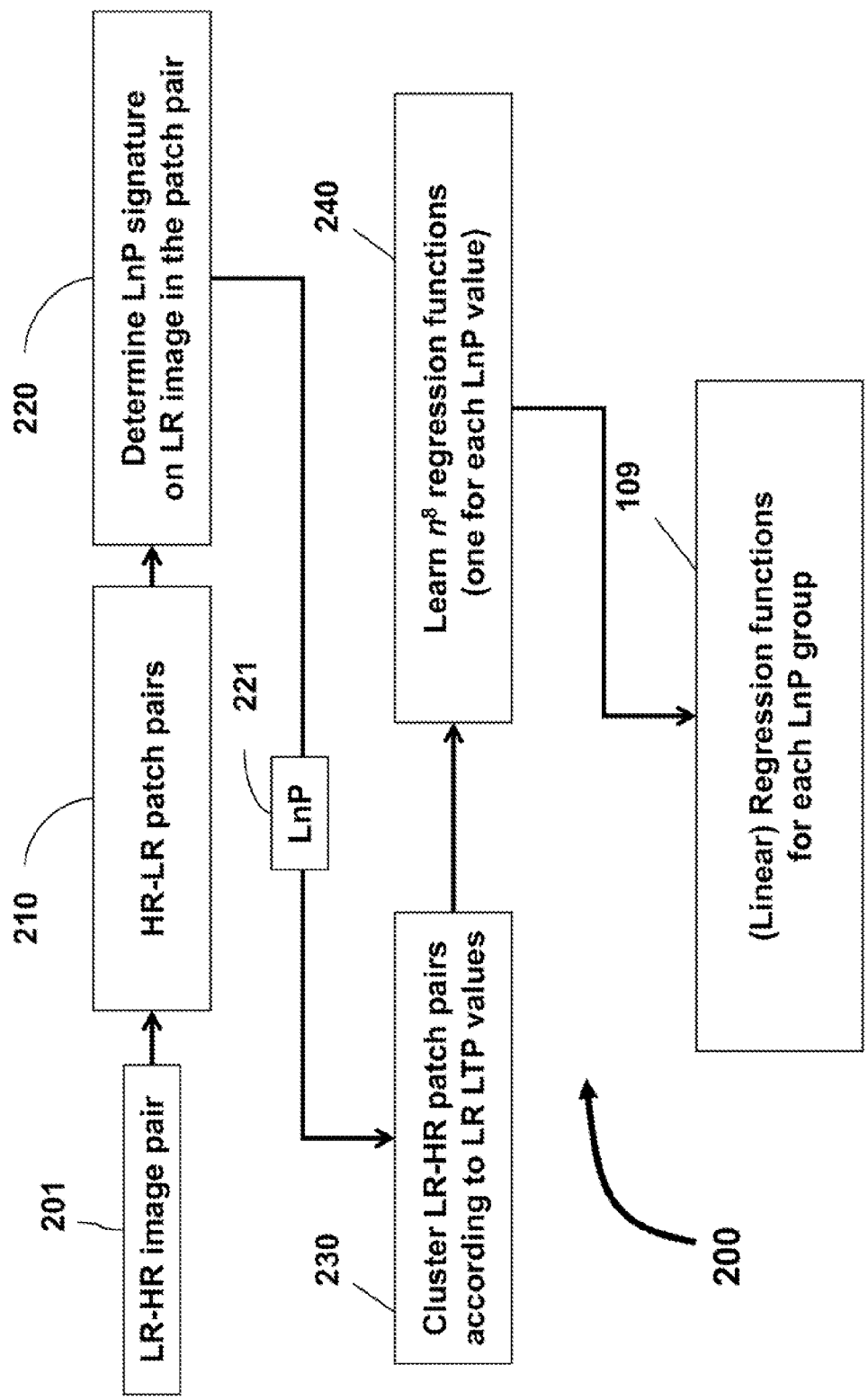
FIG. 2 is a flow diagram of the training stage according to the embodiments of the invention

As shown in FIG. 2, training is based on pairs of LR-HR images. Such pairs can be obtained by downsampling the HR image to obtain the LR image as is typically practiced in the art. The LR-HR images 201 are then partitioned into pairs of corresponding LR-HR patches 210. In one embodiment, the patches are partially overlapping. The HR patch can be a predetermined size and the LR patch is a downsampled version for some predetermined scale parameter. For example the HR patch is 5×5 pixels, and the LR patch is 3×3 pixels. It is understood that other sizes are also possible.

For each pair of patches a signature is determined. The signature may be in the form of a local n-ary pattern (LnP) 221 extracted from the LR patch in the pair. The LnP can be a local ternary pattern (LTP) or a local binary pattern (LBP). The LTP is an extension of the LBP. Unlike the LBP, the LTP does not threshold the pixels into 0 and 1, but rather uses a threshold constant to allow three values (−1, 0, +1). The following description of FIG. 2 assumes LTP, but LBP can also be used.

The next step takes a large selection of sample patches that include LR-HR patch pairs 210. This can be done by any method such as randomly selecting LR-HR patches or sampling on a uniform grid. Each member of the patch pair is centered on the same pixel. Then, we determine a signature for each LR-HR patch pair. The LnP signature is determined from the LR image in the patch pair 220. In general, and depending on the procedure used, the signatures can be determined from the LR image, a bicubic upsampled LR patch or the HR patch.

The signature is a low-dimensional descriptor. The descriptor is used as an abstraction of the patch pair's appearance. As the signature in one embodiment, we use LTP. But Local Binary Patterns (LBP), and other extensions are other possibilities.

In one embodiment, we determine the LTP feature by partitioning the LR patch into a 3×3 cell of 9 pixel intensities. To determine the LTP value, we compare the intensity of the center pixel to the intensity of each of eight neighboring pixels. We begin with the upper left cell, and move clockwise around the center cell. If the intensity is equal to or greater than the intensity of the center cell plus a threshold, men assign +1. If the intensity is equal to or smaller than the center value minus the threshold, then assign −1, otherwise assign 0:

$$\begin{cases} 1, & \text{if } p \ge c+k \\ 0, & \text{if } p > c-k \text{ and } p < c+k, \\ -1 & \text{if } p < c-k \end{cases}$$

where p is the intensity of the cell, c is the intensity of the center cell and k is the threshold.

If we use LTP values, then we have three distinct values in an eight digit vector. Thus, there can be $n^8$ distinct LTP vectors 240 for our signatures, where n is 2 for LBP and 3 for LTP.

After we determine the signature for each LR-HR patch pair, we cluster 230 the pairs with the same signature into the same group. Then, we learn 240 a regression function for each group.

To perform the learning, each LR and HR patch can be vectorized: i.e., the pixel intensities in the 2D matrix that form the patch are rearranged into a 1D vector by writing the rows of the patch side-by-side in a single row. For example a 3×3 LR patch can be formed into a 1×9 vector. Assuming there are n patch pairs, then, let $L_k$ be the matrix obtained by stacking the n LR vectors into a (e.g.) n×9 matrix, and $H_k$ be the matrix obtained by stacking the n HR vectors into a similar matrix of n rows and number of columns determined by the size of the vectorized HR patch (e.g. 5×5=25).

Then a regression function is learned that takes each LR patch and optimally maps the LR patch to its corresponding HR patch. In the case that the cost function to optimize the mapping is taken to be squared error (L2) and the HR model is linear, this learning can be done with linear regression functions (matrices) for each signature group:

$$F_k = \text{inv}(L_k^T * L_k) * L^T * H_k,$$

where $F_k$ is the learned regression function for the signature group, inv indicates an inverse, $L_k$ is the array of vectorized LR patches, T is a matrix transpose, and $H_k$ is the array of vectorized HR patches for the group. The result is a simple linear regression function 109 for each LTP group. Instead of linear regression, nonlinear regression function such as exponential functions, logarithmic functions, trigonometric functions, power functions, and Gaussian function can also be used.

In one embodiment, we can form an enlarged LR (ELR) image using bicubic upsampling of the LR image. Then, after vectorization, we are working on the same input-output array sizes. For example for a scale factor of 1.25 and LR patch size 4×4, the HR patch size will be 5×5. Suppose there are 300 patches for a signature group. Then, using the bicubic upsampled ELR patches, $L_k$ is 300×25, $H_k$ is 300×25, and $F_k$ is a 25×25 matrix, i.e., 25 is due to the vectorizing 5×5 patch into a 25×1 vector).

Instead of learning regression functions for each group individually, we can combine patch pairs of selected groups for learning a single regression function, based on a signature similarity criterion. For example, the similarity criterion can be based on rotated, symmetric, or rotated and symmetric versions of the LnPs. The rotated, i.e. shifted circularly, LnPs correspond to rotated patches. Similarly, the symmetric LnPs belong to symmetric patches. During the regression function learning stage, we combine the patch pairs of the LnPs that can be mapped to each other by symmetry and rotation (circular shift) operations into the same group after we apply the similar transforms to the corresponding patch pairs. We assign a reference LnP for the LnPs of the same group. Again, these LnPs can be transformed to the reference LnP by simple circular shift and symmetry operations. We learn a lookup table for each group that specifies the reference LnP for that group, the LnPs contained in that group, and also the order of operations applied to patches when we convert an LnP in the group to the reference LnP of the group. From these we determine the operations to rearrange the regression function coefficient of the reference LnP to obtain the regression function corresponding to the other LnPs in the same group. As a result, the number of the regression functions is decreased, and the amount of memory required to store the functions is minimized.

Another possibility is to group signatures that permit similar regression functions based on the observation that a shared regression function produces a cost not much higher than the two independent regression functions. In addition, selected signatures can be combined into a generic regression function because the signatures are very rare, e.g., the functions occur less than some predetermined threshold. Therefore, using the generic regression function affects only a few pixels in the images, and has little impact on the overall appearance of the output HR image.

Upscaling

Figure 3:
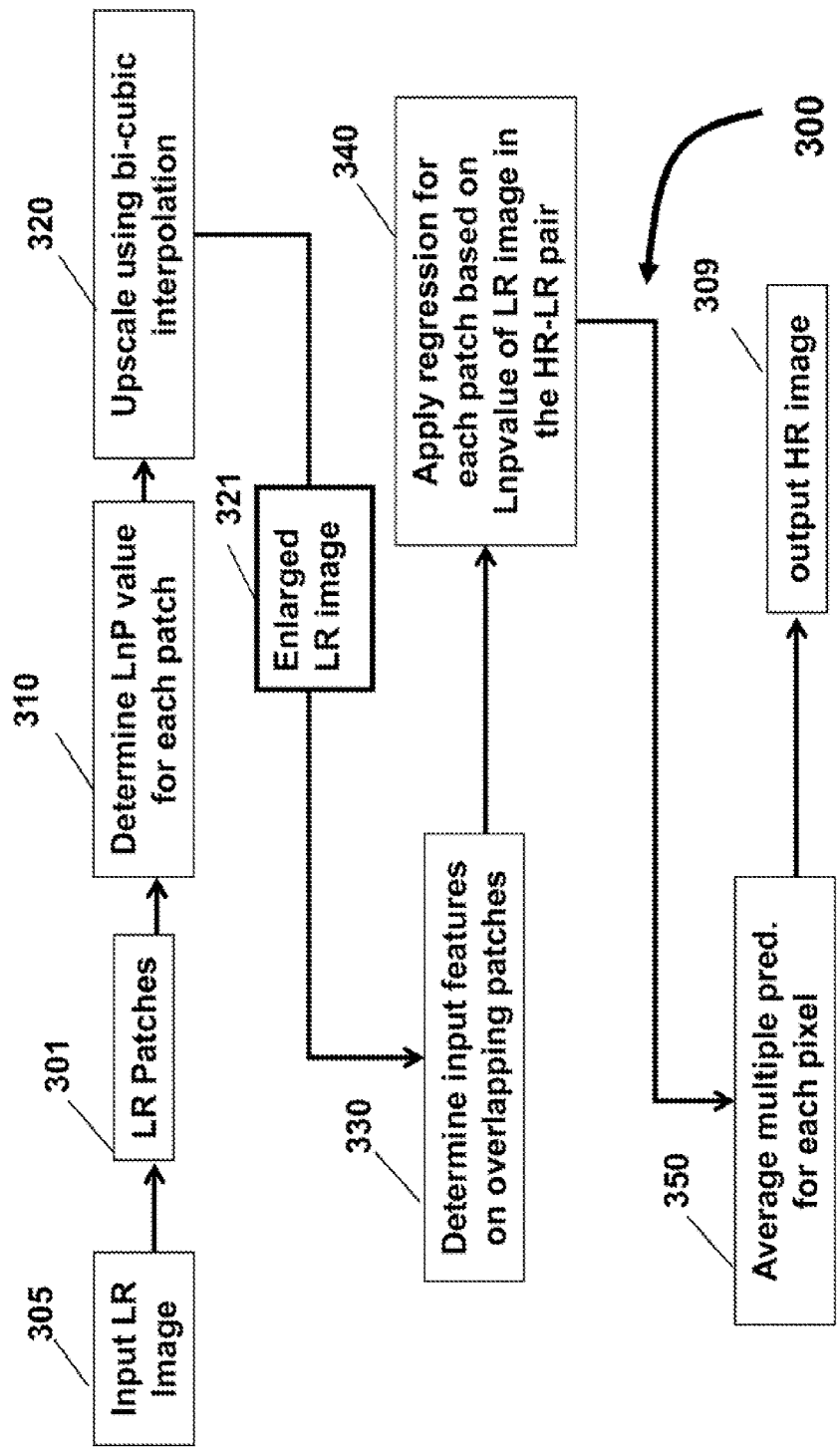
FIG. 3 is a flow diagram of the upscaling stage according to the embodiments of the invention.

As shown in FIG. 3, the upscaling 300 follows the same image partition into LR patches as training: it begins with the input LR image 305, which is partitioned into LR patches 301 for which LnPs 310 are computed. In this embodiment, the LR image is first upsampled before processing the patches because 3×3 patches have insufficient support for 5×5 patches, as described below for FIG. 4. Similarly as during training, input features can be determined 330 on overlapping patches. The amount of overlap between adjacent patches can be application specific or adaptive. Then, the regression function can be applied 340 to each patch based on the LTP value. Multiple predicted values can be averaged or a median computed 350 to construct the output HR image 309.

Figure 4:
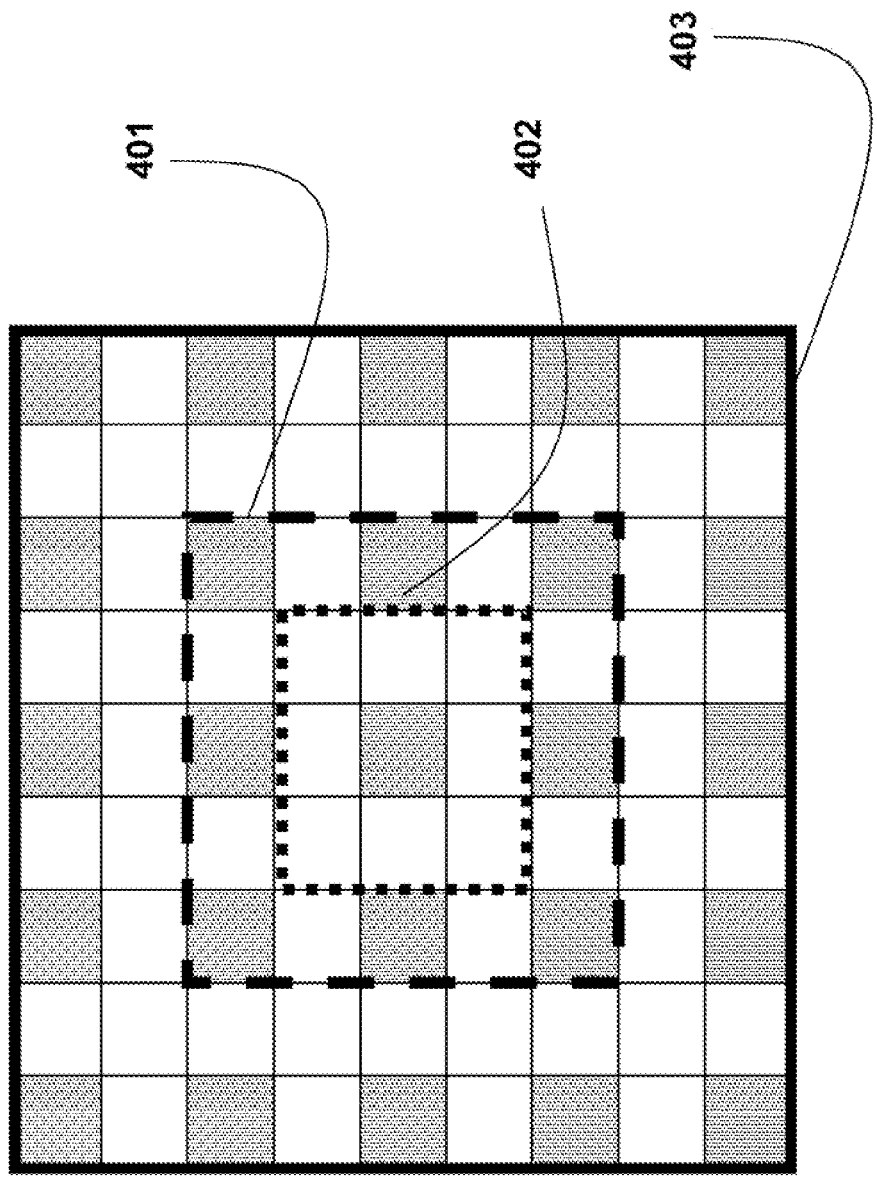
FIG. 4 is a schematic of upsampling according to some embodiments of the invention.

FIG. 4 shows another example of the upsampling, where the original LR pixels are spaced within the HR patch after 2× upsampling. The rectangle 401 shows a 5×5 HR patch and the corresponding 3×3 LR patch 402. Note however that each HR patch is a function of a 4×4 patch in the LR image, so it is impossible to start with a 3×3 LR patch and get out a 5×5 HR patch since the values in the 5×5 patch used the neighbors of the 3×3 in the LR. In fact, the support for the 5×5 patch 401 in the HR requires the entire 5×5 patch 403 in the LR.

In other words, if we start with the enlarged LR (ELR) patch, then the LTP can be determined from a sparse sampling of the ELR as shown in FIG. 4. There are four types of pixels in the ELR, i.e., original, right, down and diagonal neighbors. Each type of pixel can have the same LTP as the original pixel, or each can have its own individual LTP, in which case the operations are symmetric. In this case, the method is similar to adaptive image sharpening because the method can operate on any arbitrary image, not just the ELR image.

In another embodiment of training and upscaling, by a factor of 2, we avoid the use of an ELR as follows: again we collect patch pair clusters based on LnP values obtained from the LR images. Again regression functions are learned for each LnP value cluster. In this embodiment the regression functions that are learned directly map a 5×5 patch in the LR image to a 5×5 patch in the HR image. Since each ELR patch in the earlier embodiment was typically a linear function of the same 5×5 patch in the LR image used in the training patches, the output HR image can be the same in this embodiment, and the ELR calculation is avoided.

In a variant of this embodiment, the regression function can be trained to output a difference between HR and the ELR. This difference or approximation is the error between the HR and the ELR obtained by bicubic upsampling. Then, the output of the regression functions can be added to the ELR to generate a good approximation of the HR.

In another variant of both embodiments, instead of predicting 5×5 patches at each LR pixel, one can predict only 3×3 patches at each pixel, which saves both time due to fewer calculations and memory since the regression functions then need to be only 9×25 matrices.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for processing input low-resolution (LR) images to output high-resolution (HR) images, wherein the LR images and the HR images include corresponding LR-HR patch pairs, such that each patch includes pixel values, the method comprising:
   performing, by a processor, an offline training stage by:
      acquiring stored historical LR-HR patch pairs from a memory in communication with the processor, wherein each LR patch is a downsampled version of a corresponding HR patch of the same LR-HR patch pair;
      calculating a local n-ary pattern (LnP) for each LR-HR patch pair for all the LR-HR patch pairs, and grouping all LR-HR patch pairs with the same LnP value together; and
      obtaining for each LnP value a trained regression function appropriate for upscaling patches of that LnP value, and storing the trained regression function for that LnP value;
   performing, by the processor, a real-time upscaling stage of an input LR image by:
      acquiring each stored LR input image and processing each patch of the LR input image by:
         calculating a LnP value for each input LR patch, then using the LnP value to select a trained regression function for that patch, and then applying the selected trained regression function to that patch to obtain a corresponding HR patch;
         repeating the process for the remaining patches of the LR input image; and
         obtaining the HR output image from overlapping HR patches by averaging HR patch pixel values where HR patches overlap.

2. The method of claim 1, wherein the LnP is a local binary pattern.

3. The method of claim 1, wherein the processing operates on sequences of images.

4. The method of claim 1, wherein the patches overlap.

5. The method of claim 1, wherein the enlarging uses bicubic upsampling.

6. The method of claim 1, wherein the regression function is a linear regression function.

7. The method of claim 1, wherein the HR image patches are predetermined.

8. The method of claim 1, wherein selecting the regression function based on the determined LnP for each ELR image patch is based, in part, on overlapping patches, such that an amount of overlap between adjacent patches is one of application specific or adaptive.

9. The method of claim 1, wherein the LnP is a local ternary pattern.

10. The method of claim 9, wherein the LR image is preprocessed using bicubic upsampling to produce an enlarged LR (ELR), such that the ELR is used to replace of the LR image.

11. The method of claim 10, further comprising:
   partitioning each ELR image patch into a 3×3 cells of 9 pixels; and
   comparing an intensity of a center cell to intensities of eight neighboring cells, beginning with an upper left neighboring cell, and moving clockwise around the center cell, and if the intensity is equal to or greater than the intensity of the center cell plus a threshold, then assign +1, if the intensity is equal to or smaller than the intensity of the center cell minus the threshold, then assign −1, otherwise assign a 0 according to $$\begin{cases} 1, & \text{if } p \geq c+k \\ 0, & \text{if } p > c-k \text{ and } p < c+k, \\ -1 & \text{if } p < c-k \end{cases}$$

where p is the intensity of the cell, c is the intensity of the center cell and k is the threshold;
   clustering the patch pairs with the same signature into a same group; and
   learning the regression function for each group.

12. The method of claim 11, further comprising:
   combining the patch pairs of selected groups based on a similarity criterion; and
   learning a single function from the combined patch pairs.

13. The method of claim 12, wherein the similarity criterion is based on rotated, symmetric, or rotated and symmetric versions of the LnPs.

14. The method of claim 11, wherein selected groups are combined to train a generic regression function, wherein the selected groups occur less than some predetermined threshold.

15. The method of claim 11, further comprising:
   combining the patch pairs with symmetric LnPs in the same group;
   combining the patch pairs with rotated LnPs in the same group;

combining the patch pairs with rotated and symmetric LnPs in the same group;

choosing a reference LnP for each group;

determining a lookup table from the LnPs to the reference LnP in the same group;

transforming patch pairs in the same group by spatial rotation and mirroring operations to all pairs have the reference LnP; and learning the regression function for each group.

16. A system for processing input low-resolution (LR) images to output high-resolution (HR) images, wherein the LR images and the HR images include corresponding LR-HR patch pairs, such that each patch includes pixel values, the system comprising:

a processor; and a memory coupled to the processor and storing program instructions executable by the processor to implement, the processor is configured to:

perform an offline training stage by:

acquire stored historical LR-HR patch pairs from the memory, wherein each LR patch is a downsampled version of a corresponding HR patch of the same LR-HR patch pair;

calculate a local n-ary pattern (LnP) for every LR patch of each LR-HR patch pair for all the LR-HR patch pairs, and group all LR-HR patch pairs with the same LnP value together; and obtain for each LnP group a regression function appropriate for upscaling patches of that LnP group, and store the regression function for that LnP group;

perform a real-time upscaling stage the input LR image by:

acquire each stored LR input image and process each patch of the LR input image by:

calculate a LnP value for each input LR patch, then use the LnP value to select a trained regression function for that patch, and then apply the selected trained regression function to that patch to obtain a corresponding HR patch;

repeat the process for the remaining patches of the LR input image; and obtain the HR output image from overlapping HR patches by averaging HR patch pixel values where HR patches overlap, wherein the processing of the input LR images to the output HR images generates the output HR images having non-blurry salient edges along with non-loss of textural detail.

* * * * *